May 23, 1967 G. BACHER ETAL 3,320,628
WINDSHIELD WIPER FOR VEHICLES
Filed June 1, 1965
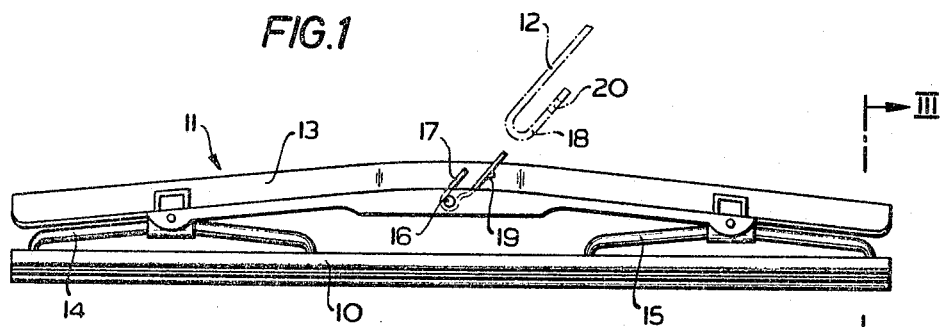
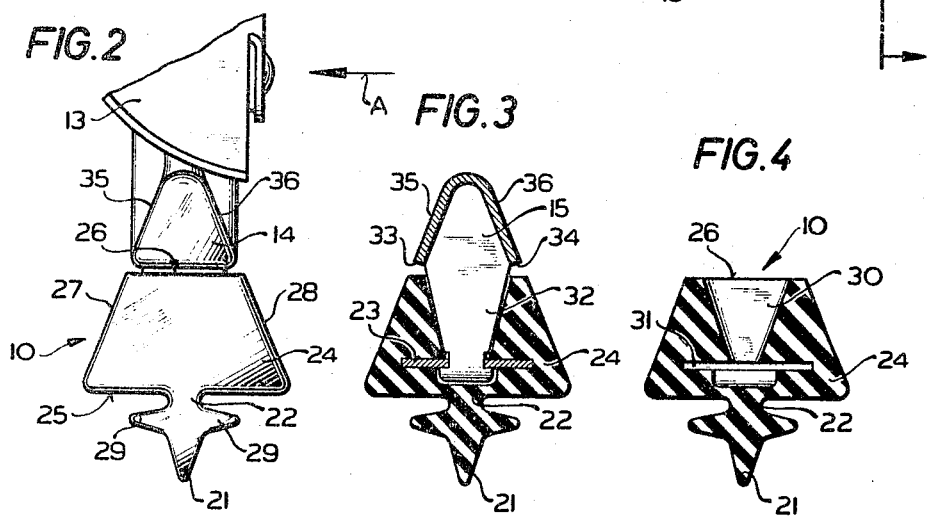
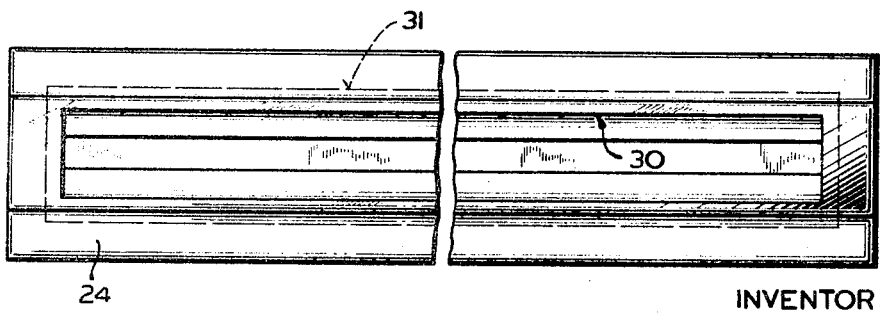
INVENTORS

United States Patent Office 3,320,628
Patented May 23, 1967

3,320,628
WINDSHIELD WIPER FOR VEHICLES
Gottlob Bacher, Stuttgart-Weilimdorf, and Robert Barth, Waldstetten, Germany, assignors to Robert Bosch G.m.b.H., Stuttgart, Germany
Filed June 1, 1965, Ser. No. 460,439
Claims priority, application Germany, June 13, 1964, B 77,248
7 Claims. (Cl. 15—250.36)

The present invention relates to windshield wipers for vehicles, and more specifically to a windshield wiper having a strip-shaped lip portion adapted to engage with one edge thereof the windshield of the vehicle, and integrally connected along the other edge thereof to a front strip portion reinforced by a flexible metal strip, which in turn is supported by means adapted to impart a reciprocating movement to the wiper along the windshield of the vehicle.

Windshield wiper blades are known in which the front strip portion of the blade has a pair of parallel side faces, whereas the strip-shaped lip portion which is connected by a thin walled web to the front strip portion has a profile which tapers toward the windshield. The airstreams acting along the windshield during travel of the vehicle will in such a construction impart to the wiper blade a force tending to lift the wiper blade away from the windshield, which will reduce the pressure of the lip portion of the wiper blade against the windshield, and which, especially during fast travel of the vehicle, will produce, in combination with the forces acting on the support of the wiper blade, the tendency to lift the lip portion of the wiper blade away from the windshield.

A further disadvantage of known windshield wiper blades is that the lip portion of the blade has a relatively great height and therefore the tendency to warp at a portion thereof engaging a curved portion of the windshield, which in turn will detrimentally effect the proper wiping action thereof.

It is an object of the present invention to overcome these disadvantages of windshield wipers known in the art.

It is an additional object of the present invention to provide a windshield wiper blade constructed in such a manner so that the air streams acting on the windshields during travel of the vehicle will not produce any forces tending to lift the wiper blade away from the windshield.

It is a further object of the present invention to provide a windshield wiper of the afore-mentioned kind, in which warping of the wiper blade is substantially avoided.

It is yet another object of the present invention to provide a windshield wiper of the afore-mentioned kind which is constructed of relatively few and simple parts, so that the windshield wiper may be produced at reasonable cost and will stand up trouble-free under extended use.

With these objects in view, the windshield wiper according to the present invention mainly comprises a wiper blade, having a resilient wiper strip including a strip-shaped lip portion adapted to engage with one edge thereof the windshield of a vehicle, and a front strip portion integrally connected along one end face thereof to the other edge of the lip portion, wherein the front strip portion has at least one longitudinal face which is inclined to the longitudinal plane of symmetry of the strip-shaped lip portion so as to be spaced further from this plane at its edge adjacent to the lip portion than at the opposite edge thereof, so that air streams acting on the windshield during travel of the vehicle will produce on the windshield wiper a force component pressing the lip portion against the windshield.

In a preferred arrangement, the front strip portion of the wiper blade has in a plane transverse to its elongation a cross section of trapezoidal configuration arranged so that the wider end face or base of the front strip portion faces the windshield and in which the strip-shaped lip portion of the wiper blade is integrally connected to the wide base portion of the front strip portion. In this arrangement, the air streams acting on the windshield during travel of the vehicle will not produce any forces tending to lift the wiper blade away from the windshield.

A flexible metal strip is embedded in the front strip portion of the wiper blade and, according to another feature of the present invention this metal strip is arranged closer to the wide base of the front strip portion than to the opposite end face thereof, and the closer this metal strip is arranged to the base of the front strip portion the smaller will be the distance thereof from the edge of the lip portion which engages the windshield and the tendency of the strip-shaped lip portion to warp will thereby be reduced. Due to the trapezoidal cross-section of the front strip portion, the metal strip can be conveniently located closely adjacent to the wide base of the front strip portion.

The height of the strip-shaped lip portion is preferably not greater than that of the front strip portion so that the whole wiper blade becomes relatively flat, whereby it can bend easily in longitudinal direction to adapt itself to the curvature of the windshield while the faces of the wiper blade on which the air streams along the windshield can act will be considerably reduced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

FIG. 1 is a side view of the windshield wiper according to the present invention and showing also the means for supporting the wiper blade;

FIG. 2 is an end view of the wiper blade and part of the means supporting the same drawn to an enlarged scale;

FIG. 3 is a section taken along the line III—III of FIG. 1 and likewise drawn to an enlarged scale;

FIG. 4 is a cross section through the wiper blade alone taken along the line III—III and likewise drawn to an enlarged scale; and FIG. 5 is a top view of the wiper blade.

Referring now to the drawings, and more specifically to FIG. 1 of the same, it will be seen that the windshield wiper arrangement according to the present invention includes a wiper blade 10 carried by support means 11 adapted to be connected to a reciprocating arm 12 indicated in dash-dotted lines in FIG. 1. The support means 11 include an elongated bow-shaped member 13 which is preferably constructed as a wind guide vane and which carries at spaced portions thereof pivotally connected thereto a pair of bow-shaped members 14 and 15 which preferably have a substantially triangular cross-section. The member 13 carries substantially midway between its ends a bolt 16 connected thereto on which a substantially U-shaped spring is mounted for tilting movement about the axis of the bolt 16. The reciprocating arm 12 has a hookshaped end portion 18 adapted to fit over the U-shaped spring 17, whereby a projection 19 on the spring is adapted to protrude into a corresponding opening 20 in the hookshaped portion of the arm so that the latter is securely connected to the support member 13.

The flexible wiper blade 10 has a lip portion 21 (FIGS. 2–4) which is integrally connected by a thin-walled web portion 22 with a front strip portion 24 reinforced by a flexible metal strip 23. The front strip portion 24 has in a plane traverse to its longitudinal plane of symmetry a cross section of trapezoidal configuration which increases toward the end face thereof to which the lip portion 21 is connected. This trapezoidal cross section will provide on the front strip portion 24 of the wiper blade a wide end face 25 facing, when the windshield wiper is mounted on a windshield the latter, a smaller end face 26 opposite the end face 25 and a pair of side faces 27 and 28 inclined to the longitudinal plane symmetry of the wiper blade. The strip-shaped lip portion 21 has preferably a height smaller than that of the front strip portion 24 and the lip portion 21 has a pair of longitudinally extending portions 29 projecting to opposite sides of the web portion 22 and adapted during reciprocation of the wiper blade to alternately abut against the end face 25 of the front strip portion 10 so that deflection of the lip portion 21 to opposite sides of the plane of symmetry of the wiper blade during reciprocation of the latter is limited.

The flexible metal strip 23 is embedded into the front strip portion 24, in such a manner that the distance of the metal strip 23 from the end face 25 of the front strip portion 24 is smaller than the distance from the end face 26. The front strip portion 24 is formed with an elongated cavity open towards the end face 26 thereof and extending nearly up to the end face 25, where it communicates with transverse grooves 31 which serve to receive the flexible metal strip 23. The elongated cavity 30, the grooves 31, and the metal strip 23 located therein are shorter than the length of the front strip portion 24. Since the wiper blade is formed from flexible material, the metal strip can be inserted into the grooves 31 through the cavity 30 by resiliently deforming the front strip portion 24 so that the elongated edge portions of the metal strip 23 will, after release of the front strip portion 24, be embedded in the latter.

The bow-shaped members 14 and 15 have at the ends thereof connecting portions 32 (FIG. 3) which extend through the cavity 30 and which are connected at their inner ends thereof with play to the metal strip 23 in the manner as best shown in FIG. 3. The side faces 35 and 36 of the bow-shaped members 14 and 15 include an angle with each other which is substantially equal to the included angle between the side faces 27 and 28 of the front strip portion 24.

The air streams acting along the windshield during travel of the vehicle in the direction of the arrow A (FIG. 2) will act on the shovel-shaped support arm 13 as well as on the inclined side faces 36 of the bow-shaped members 14 and 15 and the side face 28 of the wiper blade 10 so as to produce force components tending to press the free edge of the lip portion 21 securely against the windshield, counteracting thereby any forces tending to lift the wiper blade away from the windshield. The coordinated side faces 35 and 27, respectively 36 and 28, at the portions connecting the bow-shaped members 14 and 15 with the wiper blade 10 are respectively located in a single plane so that at this location formation of air turbulence and resulting forces tending to lift the wiper blade away from the windshield are substantially avoided.

The metal strip 23 and therewith the neutral zone of the wiper blade 10 is in the arrangement of the present invention considerably closer to the free edge of the lip portion of the wiper blade than in the above-mentioned known wiper blade constructions so that the lip portion 21 is less liable to warp, even during relatively considerable bending of the wiper blade in longitudinal direction, than the constructions known in the art. The overall height of the wiper blade is compared to known constructions relatively low so that also wind forces acting on the blade during the reciprocating movement thereof will be relatively small.

The wiper blade construction according to the present invention may not only be advantageously used with shovel-shaped or roof-shaped support members, but also with known support members of substantially U-shaped cross section. The wiper blade 10 is preferably formed from rubber, but flexible plastic material can also be used for forming the wiper blade.

It will be understood that each of the elements described above, or two or more together, may also find a useful application in other types of windshield wipers for vehicles differing from the types described above.

While the invention has been illustrated and described as embodied in a windshield wiper including a front strip portion of trapezoidal cross section, it is not intended to be limited to the details shown, since various modifications and structural changes may be made without departing in any way from the spirit of the present invention.

We claim:

1. A windshield wiper for a vehicle comprising, in combination, a wiper blade including a front strip portion of resilient material having in a cross section transverse to its longitudinal direction a substantially trapezoidal configuration continuously increasing in width towards the windshield so as to have a wide base portion facing the windshield, a single strip-shaped flexible lip portion integrally connected along one edge thereof to said wide base portion of said trapezoidally shaped front strip portion and adapted to engage with the other edge thereof the windshield, and a flexible metal strip embedded in and reinforcing said front strip portion, the distance of said metal strip from said wide base portion being smaller than the height of said single lip portion;

and means operatively connected to said wiper blade and supporting the same for reciprocating movement along the windshield, whereby air streams flowing on the windshield during travel of the vehicle will act on the inclined side faces of said front strip portion to produce a force component pressing said lip portion against the windshield.

2. A windshield wiper for a vehicle comprising, in combination, a wiper blade including a front strip portion of resilient material having a longitudinal plane of symmetry and in a plane transverse to said plane of symmetry a cross section of substantially trapezoidal configuration continuously increasing in width towards the windshield so as to have a wide base portion facing with an end face substantially normal to said plane of symmetry the windshield, a single strip-shaped flexible lip portion arranged substantially symmetrically with respect to said plane of symmetry and integrally connected along one edge thereof to said wide base portion of said trapezoidally shaped front strip portion and adapted to engage with the other edge thereof and the windshield, and a flexible metal strip embedded in and reinforcing said front strip portion, said metal strip being embedded in said front strip portion arranged closer to said wide base portion thereof than to the end face of said front strip portion opposite said wide base portion thereof, the distance of said metal strip from said wide base portion being smaller than the height of said single lip portion;

and means operatively connected to said wiper blade and supporting the same for reciprocating movement along the windshield, whereby air streams flowing on the windshield during travel of the vehicle will act on the inclined side faces of said front strip portion to produce a force component pressing said lip portion against the windshield.

3. A windshield wiper for a vehicle comprising, in combination, a wiper blade including a flexible front strip portion having a longitudinal plane of symmetry and in a plane normal to said plane of symmetry a trapezoidal cross section arranged to form on said front strip portion a wide end face adapted to face the windshield, a narrow end face opposite said wide end face and a pair of substantially plane side faces inclined to said plane of symmetry and extending between said narrow and said wide end face, a flexible metal strip embedded in said front strip portion spaced further from said narrow end face than from said wide end face thereof, said front strip portion being formed with an elongated cavity open toward said narrow end face and extending up to said metal strip, said cavity and said metal strip being shorter than said front strip portion, and a single flexible strip shaped lip portion arranged symmetrically with respect to said plane of symmetry and integrally connected along one edge portion thereof by a thin-walled web portion to said wide end face of said front strip portion and adapted to engage with the other edge portion thereof the windshield the distance of said metal strip and said wide end face being smaller than the height of said single lip portion;

and means supporting said wiper blade for reciprocating movement along the windshield and comprising an elongated bow-shaped member and a pair of short bow-shaped members extending spaced from each other along portions of said narrow end face of said strip-shaped portion and each pivotally connected at a central portion thereof to said elongated bow-shaped member and fixedly connected at opposite ends thereof by connecting portions extending through said cavity into openings in said flexible metal strip, each of said short bow-shaped members having in a plane transverse to its elongation a substantially triangular configuration tapering away from said narrow end face of said front strip portion and having a face of a width substantially equal to that of said narrow end face of said strip-shaped portion and facing the latter, and a pair of side faces including an angle with each other which is substantially equal the angle included between said side faces of said front strip portion, said elongated bow-shaped member being constructed at least over a part of its length as a wind guide vane.

4. A windshield wiper as set forth in claim 3, wherein said strip-shaped lip portion has adjacent said wide end face of said front strip portion a pair of longitudinally extending portions projecting to opposite sides of said web portion and adapted to abut with faces thereof said wide end face during reciprocation of said wiper blade.

5. A windshield wiper as set forth in claim 3, wherein said elongated bow-shaped member extends substantially over the whole length of said wiper blade and wherein said elongated bow-shaped member is over its whole length constructed as a wind guide vane.

6. A windshield wiper as set forth in claim 1, wherein said front strip portion is formed with an elongated cavity having opposite ends respectively spaced a short distance from opposite ends of said front strip portion and extending from the end face of the latter facing away from said wide base portion into said front strip portion and in the region of the inner end of said cavity with a groove extending in transverse direction to opposite sides beyond said cavity, said metal strip being insertable in said groove through said cavity, said means for supporting said wiper blade include at least one pair of connecting portions extending through said cavity and being fastened at the inner ends thereof to said metal strip.

7. A windshield wiper as set forth in claim 6, wherein said metal strip and said groove are shorter than said front strip portion but longer than said cavity.

References Cited by the Examiner

UNITED STATES PATENTS

| | | | |
|---|---|---|---|
| 2,920,335 | 1/1960 | Ryck | 15—250 |
| 3,009,185 | 11/1961 | Adams | 15—250 |
| 3,035,298 | 5/1962 | Scinta | 15—250 |
| 3,037,233 | 6/1962 | Peras et al. | 15—250 |
| 3,082,464 | 3/1963 | Smithers | 15—250 |

FOREIGN PATENTS

| | | |
|---|---|---|
| 1,124,116 | 1956 | France. |

CHARLES A. WILLMUTH, *Primary Examiner.*